United States Patent
Han

(10) Patent No.: US 11,775,166 B2
(45) Date of Patent: Oct. 3, 2023

(54) INFUSION PUMP TOUCHSCREEN WITH FALSE TOUCH REJECTION

(71) Applicant: ICU Medical, Inc., San Clemente, CA (US)

(72) Inventor: Seung Jin Han, San Diego, CA (US)

(73) Assignee: ICU Medical, Inc., San Clemente, CA (US)

( * ) Notice: Subject to any disclaimer, the term of this patent is extended or adjusted under 35 U.S.C. 154(b) by 0 days.

(21) Appl. No.: 17/808,497

(22) Filed: Jun. 23, 2022

(65) Prior Publication Data

US 2022/0413673 A1    Dec. 29, 2022

Related U.S. Application Data

(60) Provisional application No. 63/214,678, filed on Jun. 24, 2021.

(51) Int. Cl.
| | |
|---|---|
| *G06F 3/0488* | (2022.01) |
| *G06F 3/0482* | (2013.01) |
| *H04M 1/2747* | (2020.01) |
| *G06F 3/0485* | (2022.01) |

(Continued)

(52) U.S. Cl.
CPC .......... *G06F 3/0488* (2013.01); *G06F 3/0482* (2013.01); *G06F 3/0485* (2013.01); *G06F 3/04186* (2019.05); *H04M 1/2747* (2020.01); *H04M 1/724* (2021.01)

(58) Field of Classification Search
CPC ...... G06F 3/041–0488; H04M 1/2747; H04M 1/724
See application file for complete search history.

(56) References Cited

U.S. PATENT DOCUMENTS

| | | |
|---|---|---|
| 8,982,097 B1 | 3/2015 | Kuzo et al. |
| 9,606,681 B2 | 3/2017 | Rodzevski et al. |
| 9,921,743 B2 | 3/2018 | Bryant et al. |

(Continued)

FOREIGN PATENT DOCUMENTS

| | | |
|---|---|---|
| CN | 111065426 | 4/2020 |
| TW | 201911028 | 3/2019 |

(Continued)

OTHER PUBLICATIONS

International Search Report and Written Opinion received in PCT Application No. PCT/US2022/034604, dated Oct. 12, 2022 in 14 pages.

*Primary Examiner* — David Tung
(74) *Attorney, Agent, or Firm* — Knobbe Martens Olson & Bear, LLP

(57) ABSTRACT

An infusion pump is configured to reject an input as a false touch. The infusion pump includes a touchscreen display configured to display infusion pump information and to receive a touchscreen input, a processor in communication with the touchscreen display, and a memory. The memory stores instructions that when executed by the processor, cause the processor to execute a false touch rejection process. The false touch rejection process includes receiving the touchscreen input corresponding to a contact with the touchscreen display, determining a contact parameter from the touchscreen input, determining from the contact parameter, that the touchscreen input corresponds to a false touch, and rejecting the touchscreen input.

24 Claims, 4 Drawing Sheets

(51) Int. Cl.
    *G06F 3/041*    (2006.01)
    *H04M 1/724*    (2021.01)

(56) References Cited

U.S. PATENT DOCUMENTS

| | | |
|---|---|---|
| 10,365,764 B2 | 7/2019 | Korapati et al. |
| 10,437,348 B2 | 10/2019 | Hayes et al. |
| 10,545,614 B2 | 1/2020 | Maharyta et al. |
| 2012/0293447 A1 | 11/2012 | Heng et al. |
| 2014/0340338 A1* | 11/2014 | Kim ................. G06F 3/041 345/173 |
| 2016/0062533 A1* | 3/2016 | O'Connor .......... G06F 3/04186 345/173 |
| 2016/0092022 A1 | 3/2016 | Lee et al. |
| 2017/0116545 A1 | 4/2017 | Johnson et al. |
| 2018/0307375 A1* | 10/2018 | Shah ................. G06V 40/28 |
| 2020/0012382 A1 | 1/2020 | Lee |
| 2020/0064960 A1 | 2/2020 | Munemoto |
| 2020/0254174 A1 | 8/2020 | Kruse et al. |
| 2021/0162115 A1* | 6/2021 | Surine ............... G06F 3/0484 |
| 2021/0165562 A1* | 6/2021 | Matsushima ....... G06F 3/04845 |

FOREIGN PATENT DOCUMENTS

| | | |
|---|---|---|
| WO | WO 02/035460 | 5/2002 |
| WO | WO 02/035461 | 5/2002 |
| WO | WO 2022/271879 | 12/2022 |

\* cited by examiner

INFUSION PUMP TOUCHSCREEN WITH FALSE TOUCH REJECTION

CROSS-REFERENCE TO RELATED APPLICATIONS

This application claims the benefit of priority from U.S. Provisional No. 63/214,678, filed Jun. 24, 2021, which is expressly incorporated by reference in its entirety.

TECHNICAL FIELD

This disclosure relates to the field of infusion pumps, and particularly to techniques for rejecting non-user contacts with a touchscreen display.

BACKGROUND

Infusion pumps for infusing one or more fluids into a medical patient are commonplace in modern healthcare environments. A user may program such infusion pump to infuse a particular drug according to various treatment parameters, such as dose, rate, volume, and/or duration of time. The infusion pump typically includes a large touchscreen to receive user input and to display the various treatment parameters. One or more fluid-filled intravenous bags are typically hung from a support carrying the infusion pump such that the intravenous bags are positioned above the infusion pump touchscreen. One or more fluid-filled tubing lines may extend from the intravenous bag to the patient, as well. Occasionally, a fluid droplet may drip from the intravenous bag or its tubing onto the infusion pump touchscreen. In addition, the tubing itself may brush against or contact the infusion pump touchscreen, as well. Such contacts from fluid droplets and/or tubing may be interpreted by the infusion pump as a user touch input. Such false touches can interfere with infusion pump operation, such as by interrupting treatment, or by confusingly changing the information displayed on the infusion pump touchscreen. Therefore, it would be useful to provide an infusion pump with the ability to discriminate between intentional, true user touches and false touches, and to process input only in response to true touches, and to reject false touches.

SUMMARY

Various techniques for providing false touch rejection are described herein. Although many of the examples are described in the context of an infusion pump within a networked hospital environment, the techniques described herein can be applied to other medical devices in addition to infusion pumps, and other environments, including any networked or non-networked environment. The infusion pumps described herein sometimes may be other medical devices (instead of or including an infusion pump), or non-medical devices, or any combination thereof. In various embodiments, an infusion pump with false touch rejection is configured to receive a touchscreen input, determine one or more parameters of the input, and from the parameters, determine if the input was a user input (a true touch), or a false touch, such as a contact from a fluid droplet, tubing line, or other false touch. The touchscreen input parameters can include a shape of the contact, a duration of the contact, a change in shape of the contact over time, and/or a motion of the contact, and/or a change in the shape of contact as a function of its motion.

The infusion pump can determine whether the contact is a true or false touch by, for example, comparing one or more of the input parameters to a stored parameter value or set of parameter values. If the infusion pump determines that the contact is a true touch, the infusion pump process the input as a user input. If not, the infusion pump rejects the contact as a false touch.

In one embodiment, an infusion pump configured to reject an input as a false touch includes: a touchscreen display configured to display infusion pump information and to receive a touchscreen input; a processor in communication with the touchscreen display; and a memory in communication with the processor and configured to store instructions that when executed by the processor cause the execution of a false touch rejection configured to: receive the touchscreen input corresponding to a contact with the touchscreen display of the infusion pump; determine a contact parameter from the touchscreen input; determine, from the contact parameter, that the touchscreen input corresponds to a false touch; and reject the touchscreen input.

The touchscreen display may be configured to receive the touchscreen input by sensing a change to an electromagnetic field. The touchscreen display may be configured to receive the touchscreen input by sensing a change in capacitance. The touchscreen display may be configured to receive the touchscreen input by sensing a change in resistance. The instructions may configure the processor to determine the contact parameter by determining a shape of the contact corresponding to the touchscreen input. The instructions may configure the processor to determine the contact parameter by determining a position of the contact corresponding to the touchscreen input. The instructions may configure the processor to determine the contact parameter by determining a movement the contact corresponding to the touchscreen input.

The instructions may configure the processor to determine that the touchscreen input corresponds to a false touch by determining that a position of the contact corresponding to the touchscreen input moves in a downward direction. The instructions may configure the processor to determine that the touchscreen input corresponds to a false touch by determining that a volume of the contact corresponding to the touchscreen input increases over time. The instructions may configure the processor to determine that the touchscreen input corresponds to a false touch by determining that a width of the contact corresponding to the touchscreen input remains constant and a height of the contact increases over time. The instructions may configure the processor to determine that the touchscreen input corresponds to a false touch by determining that a lower edge of the contact corresponding to the touchscreen input is positioned at or near a lower edge of the touchscreen and that a height of the contact decreases over time.

The instructions may configure the processor to determine that the touchscreen input corresponds to a false touch by determining that a height of the contact corresponding to the touchscreen input is or is at least 2, 3, 4, 5, or more times the width of the contact. The height can be any height, up to the height of the touchscreen. In some embodiments, the instructions may configure the processor to determine that the touchscreen input corresponds to a false touch by determining that a position of the contact corresponding to the touchscreen input does not change over a predetermined time period. In some embodiments, the instructions may configure the processor to determine that the touchscreen input corresponds to a false touch by determining that a position of the contact corresponding to the touchscreen input changes in a horizontal direction over a predetermined time period. In some embodiments, the instructions may configure the processor to determine that the touchscreen input corresponds to a false touch by determining that the height to width ratio of the contact corresponds to the height to width ratio of an IV tube, regardless of the contact location or motion.

A method of rejecting an input as a false touch to a touchscreen display of a medical device includes: receiving a touchscreen input corresponding to a contact with a touchscreen display of a medical device; determining a contact parameter from the touchscreen input; determining, from the contact parameter, that the touchscreen input corresponds to a false touch; and rejecting the touchscreen input.

Receiving the touchscreen input may comprise sensing a change to an electromagnetic field. Receiving the touchscreen input may comprise sensing a change in capacitance. Determining a contact parameter may comprise determining a shape of the contact corresponding to the touchscreen input. Determining a contact parameter may comprise determining a position of the contact corresponding to the touchscreen input. Determining a contact parameter may comprise determining a movement the contact corresponding to the touchscreen input.

Determining that the touchscreen input corresponds to a false touch may comprise determining that a position of the contact corresponding to the touchscreen input moves in a downward direction. Determining that the touchscreen input corresponds to a false touch may comprise determining that a volume of the contact corresponding to the touchscreen input increases over time. Determining that the touchscreen input corresponds to a false touch may comprise determining that a width of the contact corresponding to the touchscreen input remains constant and a height of the contact increases over time. Determining that the touchscreen input corresponds to a false touch may comprise determining that a lower edge of the contact corresponding to the touchscreen input is positioned at or near a lower edge of the touchscreen and that a height of the contact decreases over time.

Determining that the touchscreen input corresponds to a false touch may comprise determining that a height of the contact corresponding to the touchscreen input is or is at least 2, 3, 4, 5, or more times the width of the contact. The height can be any height, up to the height of the touchscreen. In some embodiments, determining that the touchscreen input corresponds to a false touch may comprise determining that a position of the contact corresponding to the touchscreen input does not change over a predetermined time period. In some embodiments, determining that the touchscreen input corresponds to a false touch may comprise determining that a position of the contact corresponding to the touchscreen input changes in a horizontal direction over a predetermined time period. In some embodiments, determining that the touchscreen input corresponds to a false touch may comprise determining that the height to width ratio of the contact corresponds to the height to width ratio of an IV tube, regardless of the contact location or motion.

Such false touch rejection advantageously enables the infusion pump to reject inadvertent touchscreen contacts as false touches, and to avoid processing such false touches as user input. The features described herein help prevent therapy interruption and confusing display changes. These and other embodiments are described in greater detail below with reference to FIGS. 1-4.

BRIEF DESCRIPTION OF THE DRAWINGS

The embodiments described herein are illustrated by way of example, and not by way of limitation, in the figures of the accompanying drawings in which like references indicate similar elements.

DETAILED DESCRIPTION

Introduction

Figure 1:
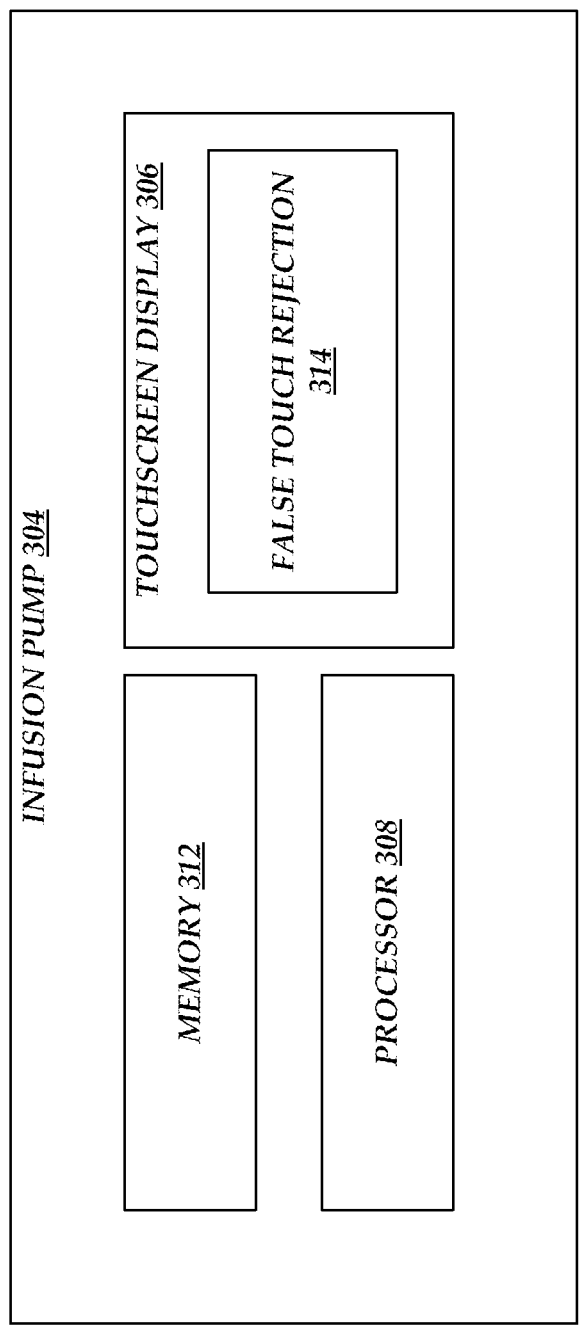
FIG. 1 is a block diagram illustrating components of an example infusion pump with false touch rejection in accordance with aspects of the present disclosure.

An infusion pump for infusing one or more fluids into a medical patient may be programmed by a user to infuse a particular drug according to various treatment parameters, such as dose, rate, volume, and/or duration of time. Certain clinical values may be entered into the infusion pump by the user, retrieved from a database (e.g., an electronic medical record ("EMIR"), etc.) over a hospital network, and/or determined by the pump from one or more sensors (e.g., location). These clinical values may be used to determine one or more of the treatment parameters used to deliver a desired infusion therapy to the medical patient.

An infusion pump typically includes a touchscreen display (referred to herein as a touchscreen) to receive user input and to display pump operating parameters and programming values. The touchscreen is activated by a change in an electronic characteristic sensed by the touchscreen. For example, the touchscreen may include a rectangular array of sensors that can detect a change in capacitance when affected by an external contact. The touchscreen responds to the contact by sending an array of sensor values to a processor. The processor can determine the position on the touchscreen where the contact occurred. The processor can also determine other parameters, including but not limited to, a shape of the contact, a duration of the contact, a motion of the contact, etc. If the contact position corresponds to a location where a user input is provided, the processor can identify the contact as a user input and enable additional functionality in response to the contact.

However, fluid droplets (e.g., saline, medication, etc.) or tubing lines can sometimes contact the infusion pump touchscreen. Embodiments described herein describe infusion pumps configured to identify and reject such contacts as unintended and as false touches.

For example, the dielectric characteristic of certain intravenous medications and fluids can interfere with the electric field of a touchscreen input surface, causing the touchscreen to interpret the presence of such medications or fluids as user input. Saline, such as 0.9% saline is one such commonly used fluid that can cause such touchscreen interference if dripped on a touchscreen's surface.

In addition, many infusion pumps and other touchscreen-enabled medical devices are typically positioned such that their touchscreens are oriented vertically. For example, an infusion pump may be placed on a tabletop or mounted on a medical pole. With such orientation, intravenous fluid that drops onto the touchscreen surface moves due to gravity in a downward direction and therefore causes an electrical field interference sensed by the touchscreen to also moves in a downward direction. In addition, the electrical field interference will typically remain for a short time at the original contact location due to viscosity and then gradually change its contact size at that initial location due to its movement in the downward direction. Finally, the shape of the electrical field interference generally increases in volume over time, with the contact shape's width remaining relatively fixed and the shape's length extending vertically downward as the fluid moves and changes shape from a droplet to a streak extending down the touchscreen surface.

A touchscreen controller is configured to analyze the motion (e.g., direction, location, etc.) and shape of the contact, the infusion pump and is able to determine whether the contact is a user input or a false contact. User input is further processed, while false contacts are rejected and ignored.

Intravenous tubing lines dangling near and contacting a touchscreen can cause electrical field interference, as well. Similar to fluid droplets, such tubing line contact may be erroneously interpreted as user input. For example, the dielectric characteristics of fluids within intravenous tubing (e.g., saline 0.9%, etc.) can interfere with the touchscreen electrical field.

The touchscreen controller may be configured to distinguish between a user input (via intentional touching of the infusion pump's touchscreen) and a false touch caused by accidental contact with a tubing line. For example, the tubing line will often have a fixed diameter (e.g., 3 mm or 4 mm) and a relatively longer length than its width. Such geometry is detected by the touchscreen, and by identifying such dimensions, shapes and/or proportions, the touchscreen controller is able to determine when a contact is the result of contact with intravenous tubing instead of being an intentional user input. User input is further processed, while false contacts are rejected and ignored.

Infusion Pump Architecture

With reference to FIG. 1, the components of an example infusion pump are described in greater detail. The example architecture of the infusion pump 304 depicted in FIG. 1 includes an arrangement of computer hardware and software components that may be used to implement aspects of the present disclosure. The infusion pump 304 may include many more (or fewer) elements and/or sub-elements than those shown in FIG. 1. It is not necessary, however, that all of these elements be shown in order to provide an enabling disclosure.

As illustrated, the infusion 304 includes a touchscreen display 306, a processor 308, and a memory 312, all of which may communicate with one another by way of a communication bus (not shown). The touchscreen display 306 may display information generated or stored by the infusion pump 304 or any other information associated with the infusion pump 304. For example, infusion pump 304 may be used to deliver medication to a patient. In such a case, the touchscreen display 306 may display the volume of the medication infused so far, the volume of the medication to be infused, the rate at which the medication is being infused, and the like.

The touchscreen display 306 may be further configured to receive a user input. For example, the touchscreen display 306 may provide a graphical, displayed keypad to the user for data entry and programming. In some embodiments, touchscreen display's display surface experiences a change in an electrical characteristic, such as capacitance (and/or other electrical characteristic(s)), when a user touches the touchscreen display surface. The touchscreen display 306 can sense the change in the electrical characteristic and a processor can determine a location on the touchscreen display 306 where the contact occurred, the duration of the contact, a motion associated with the contact, or other contact parameter. In some embodiments, the processor configured to analyze contact with the touchscreen is a component of the touchscreen display 306. In other embodiments, the processor is external to the touchscreen display 306, such as processor 308. The processor, whether internal to the touchscreen display 306 or external to the touchscreen display 306 (e.g., processor 308 or other processor) may be further configured to execute a false touch rejection process, as further described below. Examples of such displays are illustrated in FIG. 2A through FIG. 2D.

The processor 308 may receive information and instructions from other computing systems or services via a network. The processor 308 may also transmit information to and receive information from the memory 312 and further provide content to the touchscreen display 306 for display. An optional network interface (not shown) may provide connectivity to one or more networks or computing systems in the network environment. For example, the network interface may be a serial port, a parallel port, or any other communication interface that can enable or facilitate wired or wireless communication according to any communication protocols such as Zigbee (e.g., IEEE 802.15.4), Bluetooth, Wi-Fi (e.g., IEEE 802.11), Near Field Communication (NFC), and the like.

The memory 312 may contain computer program instructions (grouped as modules in some embodiments) that the processor 308 can execute in order to implement one or more aspects of the present disclosure. The memory 312 may include RAM, ROM, and/or other persistent, auxiliary, or non-transitory computer-readable media. In some embodiments, the memory 312 stores an operating system that provides computer program instructions for use by the processor 308 in the general administration and operation of the infusion pump 304. The memory 312 may include computer executable instructions to execute a false touch rejection 314 process. However, in some embodiments, the computer executable instructions to execute a false touch rejection 314 process are stored in a memory (not shown) of the touchscreen display 306, or are loaded into a memory or processor of the touchscreen display 306 from the memory 312 (or other location). In some embodiments, the false touch rejection 314 implements various aspects of the present disclosure.

Although not shown in FIG. 1, the infusion pump 304 may further include one or more input devices such as mechanical buttons or a voice recognition system. Further, the infusion pump 304 may include one or more additional storage devices for storing data generated by the infusion pump 304 or other data utilized in implementing aspects of the present disclosure.

Infusion Pump with Droplet False Touch Rejection

With reference now to FIGS. 2A-2D, example infusion pump touchscreen displays illustrating droplet false touch rejection will be described. FIGS. 2A-2D illustrate one embodiment of an infusion pump touchscreen display 500 over time. The touchscreen display 500 has a upper edge 502 and a lower edge 504 positioned in a downward direction with respect to the upper edge 502. A droplet of fluid or medication contacts the touchscreen display 500 and causes a disturbance to the electromagnetic field of the touchscreen display 500. The touchscreen display's sensors interpret this disturbance as a contact 506 (506A-506D) having a width

508 (508A-D) and length 510 (510A-510D) corresponding to the shape of the electromagnetic field disturbance.

Intentional user contact, such as by the tip of a user's finger, will cause a contact having a circular or oval shape. Such shape will be detected and then will disappear as the user removes his or her finger from the touchscreen display 500. When the intentional user contact, such as by the tip of a user's finger, moves on touchscreen display 500, the size or shape remains at different locations. For example, when the fingertip contact is used to perform a scrolling operation on the touchscreen display, the shape remains substantially the same as its position changes. However, when a fluid droplet contacts the touchscreen display 500, the contact 506 shape and position may change as illustrated in FIGS. 2A-2D.

Figure 2A:
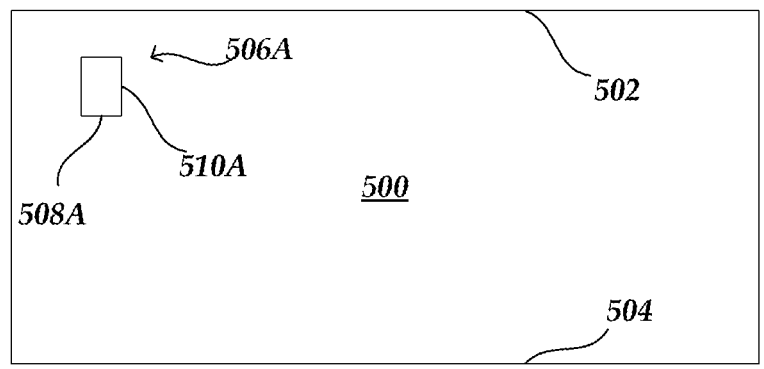
FIGS. 2A-2D illustrate example touchscreen display screens of the infusion pump of FIG. 1 showing one implementation of droplet false touch rejection.
Figure 2B:
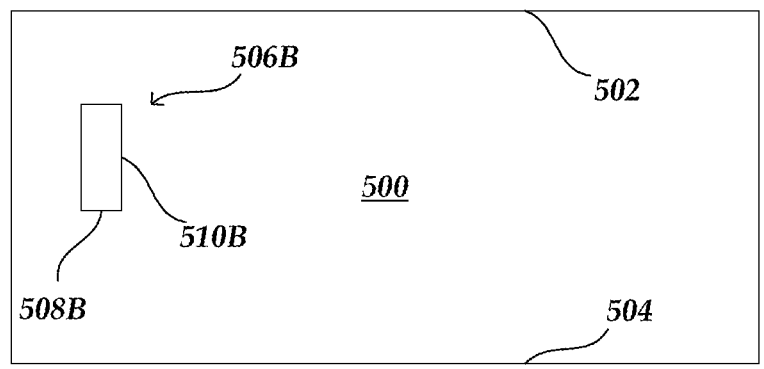

In FIG. 2A, the contact 506A shape corresponds roughly to the shape of the droplet. The shape 506A may remain in its initial contact location for a period due to viscosity of the fluid and surface tension with the touchscreen display 500. After a certain time period, as shown in FIG. 2B, the fluid droplet may begin to slide down the face of the touchscreen display 500 towards the touchscreen display's lower edge 504. As the droplet moves, the contact shape 506B will extend in length 510B in the downward direction, resulting in an increase in the shape 506B volume. The center of the contact 506B may move vertically downward, as well. The width 508B of the contact 506B remains substantially the same.

In one embodiment, the contact 506A, 506B may be determined to be a false, droplet contact merely from the change one or more contact parameters from a first shape of the contact 506A to a second shape of the contact 506B. For example, the change in shape of the contact 506A, 506B, its position (where the upper edge of the contact 506A, 506B are in approximately the same location, but the lower edge of the contact 506A, 506B moves, or a change in position of the upper edge of the contact 506A, 506B is less than a change in position of the lower edge of the contact 506A, 506B, etc.) may be used by a processor to determine that the contact 506A, 506B is a false contact (e.g., caused by a droplet that has fallen onto the touchscreen surface and is travelling downward across the touchscreen). Improved latency in false contact detection may be achieved by performing false contact analysis as shortly after a vertical change in position of a contact is detected by the touchscreen.

Figure 2C:
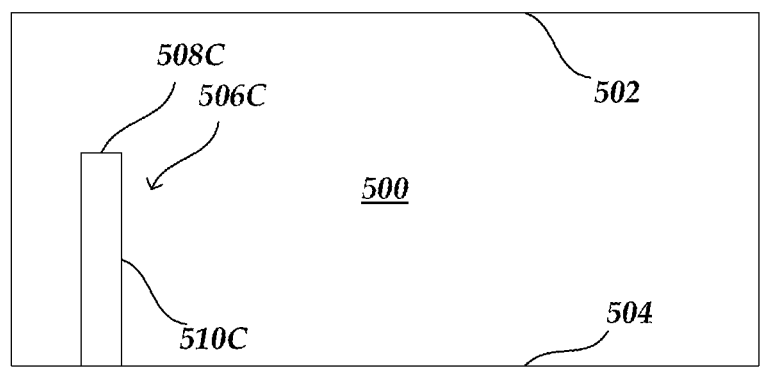
Figure 2D:
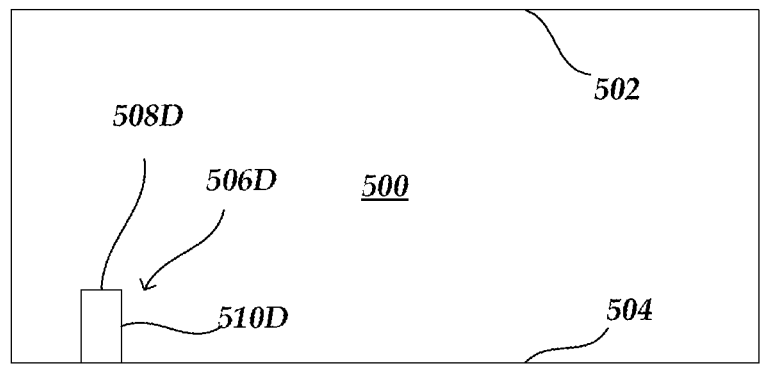

Eventually, the droplet may reach the lower edge 504 of the touchscreen display 500, as shown in FIG. 2C. Such movement results in a change in the shape of the contact 506C such that the lower edge of the contact 506C reaches the lower edge 504 of the touchscreen display 500. The length 510C extends to the lower edge 504, as well, while the contact's width 508C remains substantially the same. This movement results in a further increase in the contact 506C volume. The fluid droplet continues to move downward to the lower edge 504 of the touchscreen display 500, causing the overall height 510D of the contact 506D to decrease, as shown in FIG. 2D. The contact 506D width 508D remains substantially the same as the height 510D decreases, causing the contact 506D volume to decrease.

A processor with false touch rejection functionality (e.g., a processor of the touchscreen display 306 or processor 308, either executing the false touch rejection 314 of FIG. 1) can identify such droplet contacts by analyzing one or more of these contact parameters (e.g., position, movement, shape, etc.), and cause the infusion pump to disregard such inputs as false touches.

Infusion Pump with Tubing False Touch Rejection

Figure 3:
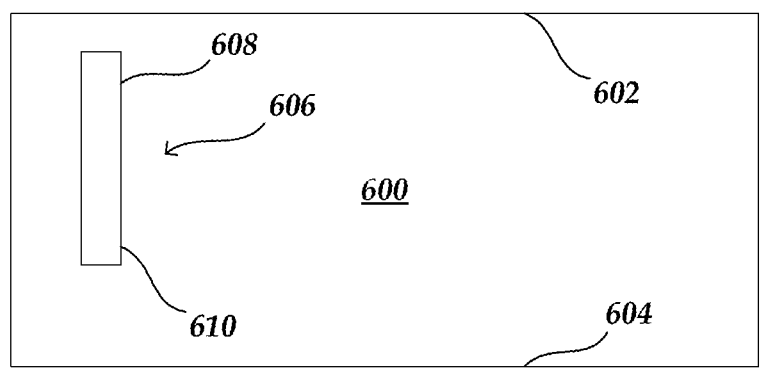
FIG. 3 illustrates an additional example touchscreen display screen of the infusion pump of FIG. 1 showing one implementation of tubing false touch rejection.

With reference now to FIG. 3, an example infusion pump touchscreen displays illustrating tubing false touch rejection will be described. The touchscreen display 600 has a upper edge 602 and a lower edge 604 positioned in a downward direction with respect to the upper edge 602. A portion of a tubing line contacts the touchscreen display 600 and causes a disturbance to the electromagnetic field of the touchscreen display 600. The touchscreen display's sensors interpret this disturbance as a contact 606 having a width 608 and length 610 corresponding to the shape of the electromagnetic field disturbance.

Figure 4:
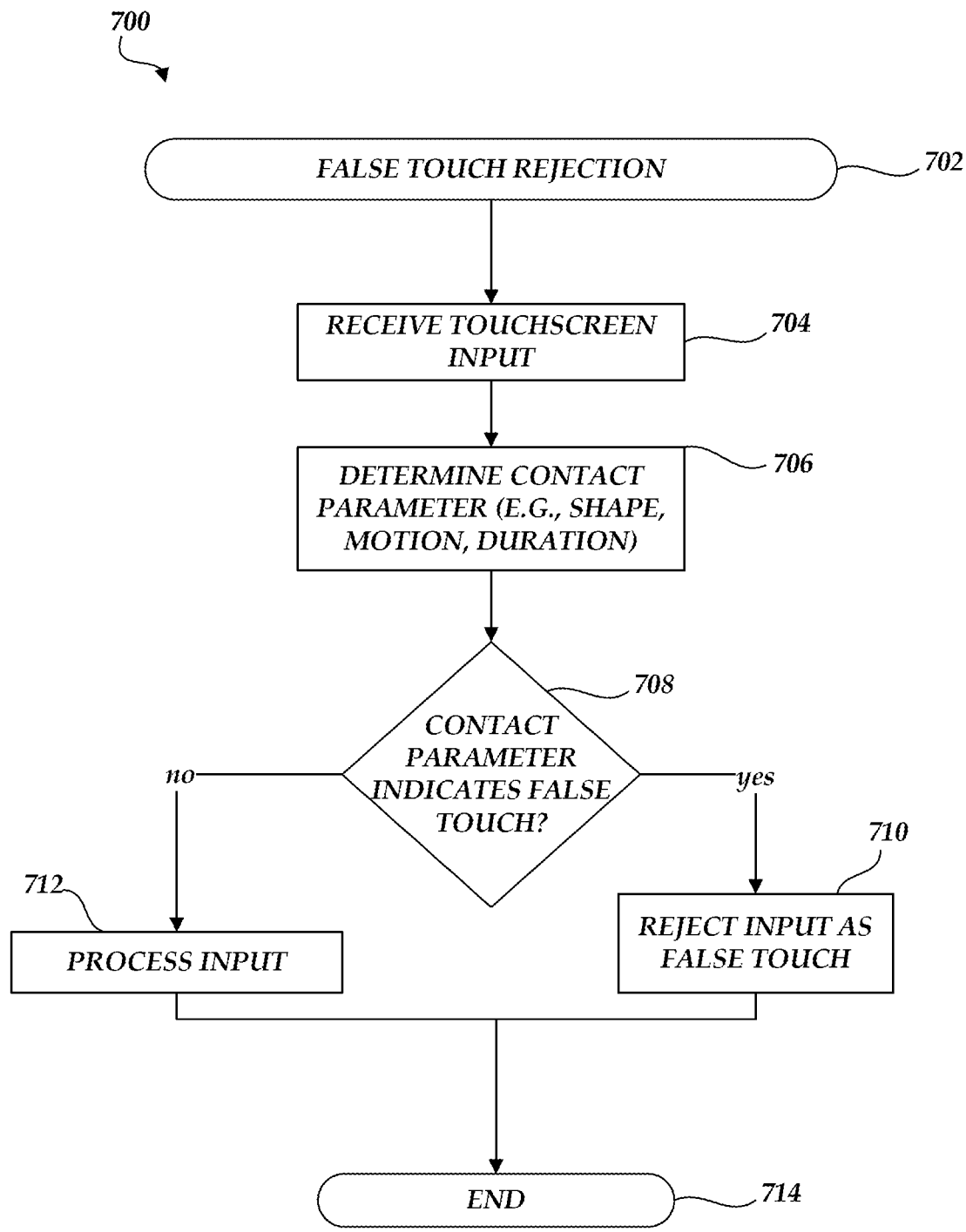
FIG. 4 illustrates one method of false touch rejection that may be implemented by the infusion pump of FIG. 1.

Intentional user contact, such as by the tip of a user's finger, will cause a contact having a circular or oval shape. Such shape will be detected and then will disappear as the user removes his or her finger from the touchscreen display 600. However, when a tubing line contacts the touchscreen display 600, the contact 606 shape, dimension(s) and/or position may have the properties as illustrated in FIG. 4.

The rectangular shape of the contact 606 corresponds roughly to the shape of the tubing line. The contact 606 rectangular shape has a width 608 and/or a height 610 corresponding to the width and/or length of the tubing segment contacting the touchscreen display 600. For example, the contact width 608 may be 3-4 mm and the contact length may be in the range of 6-8 mm, 9-12 mm, 12-16 mm, or 15-20 mm, or more, and it may change as the tubing brushes against the touchscreen display 600. In some embodiments, the length 610 of the contact 606 is 2×, 3×, 4×, or 5× its width 608. In some embodiments, the contact 606 remains in the same position over time. In other embodiments, the contact 606 location moves laterally to one side or side-to-side as the tubing is pulled or swings across the infusion pump's touchscreen display 600.

A processor with false touch rejection functionality (e.g., processor 308 executing the false touch rejection 314 of FIG. 1) can identify such tubing contacts by analyzing one or more of these contact parameters (e.g., position, movement, shape, etc.), and cause the infusion pump to disregard such inputs as false touches. For example, the processor can determine that the shape (e.g., rectangular) and dimension (e.g., width alone, length alone, or width and length together) of the contact indicate that the contact is a tubing line touching the touchscreen display and reject the contact as a false touch. In another example, the processor can determine that motion associated with the contact (e.g., laterally, side-to-side, or movement to one side and then back to the other side (left to right then right to left; right to left then left to right) indicates that the contact is a tubing line touching the touchscreen display and subsequently reject the contact as a false touch.

False Touch Rejection Process

With reference now to FIG. 4, an example false touch process or method 700 will be described. The example method 700 may be performed, for example, by the infusion pump 304 of FIG. 2 (or one or more components thereof, such as the false touch rejection 314). The method 700 illustrates an example algorithm that may be programmed, using any suitable programming environment or language, to create machine code capable of execution by a CPU or microcontroller of the infusion pump 304, such as the processor 308 or a processor of the touchscreen display 306, or any other processor. Various embodiments may be coded using assembly, C, OBJECTIVE-C, C++, JAVA, or other human-readable languages and then compiled, assembled, or otherwise transformed into machine code that can be loaded into read-only memory (ROM), erasable programmable read-only memory (EPROM), or other recordable memory of the infusion pump 304 that is coupled to the CPU or microcontroller and then then executed by the CPU or microcontroller. For convenience, the steps of the example method 700 are described as being performed by the false touch rejection 314 of infusion pump 304.

The method 700 begins at block 702. At block 704, the infusion pump receives a touchscreen input from its touchscreen display. The touchscreen input may correspond to an intentional user input (e.g., a true touch to the touchscreen) or an inadvertent contact with the touchscreen, such as from a fluid droplet or a tubing line. The touchscreen sensors determine a touchscreen display contact corresponding to the input. At block 706, the infusion pump determines one or more parameters of the contact. For example, the infusion pump may determine one or more of a physical dimension (e.g., width, height), shape, location, motion, contact duration, etc. of the contact. Some parameters may be determined over a predetermined time period, such as the motion direction, position, or shape of the contact, as such parameters may change over time.

At block 708, the infusion pump determines whether the contact corresponds to a false touch based on one or more of the contact parameters. For example, if the shape, motion, and/or position of the contact change as discussed above with respect to FIGS. 3A-3D, the infusion pump may determine that a droplet false touch has occurred at block 708. Similarly, if the shape, motion, and/or position of the contact change as discussed above with respect to FIG. 4, the infusion pump may determine that a tubing false touch has occurred at block 708.

If a false touch is determined, the method 700 proceeds to block 710, where the input is rejected as a false touch. For example, the infusion pump may ignore the input and proceed to block 714, where the method 700 ends. If at block 708 a false touch is not determined, the method 700 proceeds to block 712, where the input is processed as a valid input. For example, the infusion pump may determine and execute further actions based upon the location of the contact. The method 700 proceeds to block 714, where the method 700 ends.

Other Considerations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure. Further, additional embodiments created by combining any two or more features or techniques of one or more embodiments described herein are also intended to be included herein within the scope of this disclosure.

What is claimed is:

1. An infusion pump configured to reject an input as a false touch, the infusion pump comprising:
    a touchscreen display configured to display infusion pump information and to receive a touchscreen input;
    a processor in communication with the touchscreen display; and
    a memory in communication with the processor and configured to store instructions that when executed by the processor cause the execution of a false touch rejection configured to:
        receive the touchscreen input corresponding to a contact with the touchscreen display of the infusion pump;
        determine a contact parameter, including a shape of the contact, from the touchscreen input;
        determine that the shape of the contact corresponds to a shape of a tubing segment, and therefore the touchscreen input corresponds to a false touch; and
        reject the touchscreen input.

2. The infusion pump of claim 1, wherein the touchscreen display is configured to receive the touchscreen input by sensing a change to an electromagnetic field.

3. The infusion pump of claim 1, wherein the touchscreen display is configured to receive the touchscreen input by sensing a change in capacitance.

4. The infusion pump of claim 1, wherein the instructions configure the processor to determine the contact parameter by determining a position of the contact corresponding to the touchscreen input.

5. The infusion pump of claim 1, wherein the instructions configure the processor to determine the contact parameter by determining a movement the contact corresponding to the touchscreen input.

6. The infusion pump of claim 1, wherein the instructions configure the processor to determine that the touchscreen input corresponds to the false touch by determining that a position of the contact corresponding to the touchscreen input moves in a downward direction.

7. The infusion pump of claim 1, wherein the instructions configure the processor to determine that the touchscreen input corresponds to the false touch by determining that a volume of the contact corresponding to the touchscreen input increases over time.

8. The infusion pump of claim 1, wherein the instructions configure the processor to determine that the touchscreen input corresponds to the false touch by determining that a width of the contact corresponding to the touchscreen input remains constant and a height of the contact increases over time.

9. The infusion pump of claim 1, wherein the instructions configure the processor to determine that the touchscreen input corresponds to the false touch by determining that a lower edge of the contact corresponding to the touchscreen input is positioned at or near a lower edge of the touchscreen and that a height of the contact decreases over time.

10. The infusion pump of claim 1, wherein the instructions configure the processor to determine that the touchscreen input corresponds to the false touch by determining that a height of the contact corresponding to the touchscreen input is or is at least 2, 3, 4, 5, or more times the width of the contact.

11. The infusion pump of claim 10, wherein the instructions configure the processor to determine that the touchscreen input corresponds to the false touch by determining that a position of the contact corresponding to the touchscreen input does not change over a predetermined time period.

12. The infusion pump of claim 10, wherein the instructions configure the processor to determine that the touchscreen input corresponds to the false touch by determining that a position of the contact corresponding to the touchscreen input changes in a horizontal direction over a predetermined time period.

13. A method of rejecting input as a false touch to a touchscreen display of a medical device, the method comprising:
    receiving a touchscreen input corresponding to a contact with a touchscreen display of a medical device;
    determining a contact parameter, including a shape of the contact, from the touchscreen input;

determining that the shape of the contact corresponds to a shape of a tubing segment, and therefore the touchscreen input corresponds to a false touch; and rejecting the touchscreen input.

14. The method of claim 13, wherein receiving the touchscreen input comprises sensing a change to an electromagnetic field.

15. The method of claim 13, wherein receiving the touchscreen input comprises sensing a change in capacitance.

16. The method of claim 13, wherein determining the contact parameter comprises determining a position of the contact corresponding to the touchscreen input.

17. The method of claim 13, wherein determining the contact parameter comprises determining a movement the contact corresponding to the touchscreen input.

18. The method of claim 13, wherein determining that the touchscreen input corresponds to the false touch comprises determining that a position of the contact corresponding to the touchscreen input moves in a downward direction.

19. The method of claim 13, wherein determining that the touchscreen input corresponds to the false touch comprises determining that a volume of the contact corresponding to the touchscreen input increases over time.

20. The method of claim 13, wherein determining that the touchscreen input corresponds to the false touch comprises determining that a width of the contact corresponding to the touchscreen input remains constant and a height of the contact increases over time.

21. The method of claim 13, wherein determining that the touchscreen input corresponds to the false touch comprises determining that a lower edge of the contact corresponding to the touchscreen input is positioned at or near a lower edge of the touchscreen and that a height of the contact decreases over time.

22. The method of claim 13, wherein determining that the touchscreen input corresponds to the false touch comprises determining that a height of the contact corresponding to the touchscreen input is or is at least 2, 3, 4, 5, or more times the width of the contact.

23. The method of claim 22, wherein determining that the touchscreen input corresponds to the false touch comprises determining that a position of the contact corresponding to the touchscreen input does not change over a predetermined time period.

24. The method of claim 22, wherein determining that the touchscreen input corresponds to the false touch comprises determining that a position of the contact corresponding to the touchscreen input changes in a horizontal direction over a predetermined time period.

* * * * *